April 18, 1939. J. A. O'DAY 2,154,914
COUPLING DEVICE
Filed March 10, 1936

INVENTOR
JAMES A. O'DAY
BY Van Deventer & Griet
ATTORNEYS.

Patented Apr. 18, 1939

2,154,914

UNITED STATES PATENT OFFICE

2,154,914

COUPLING DEVICE

James A. O'Day, New York, N. Y.

Application March 10, 1936, Serial No. 68,020

1 Claim. (Cl. 285—57)

This invention relates to improvements in coupling devices which may be used for coupling conduits of any description, and is particularly devised for coupling hose and the like, and has for its principal object the provision of detachable couplings, secured together by means of cams and levers which compress the couplings together perceptibly so that they are capable of withstanding high pressures.

A further object of the invention is the provision of a coupling comprised of two members each of which is identical in shape and form with the other, thereby permitting the hose bearing one such member to be coupled to any one of a plurality of conduits bearing like coupling members which readily mate with the first coupling member.

Other objects of the invention will be apparent to those skilled in the art.

Referring now to the drawing which shows by illustration one preferred embodiment of the invention:

Figures 1, 2:
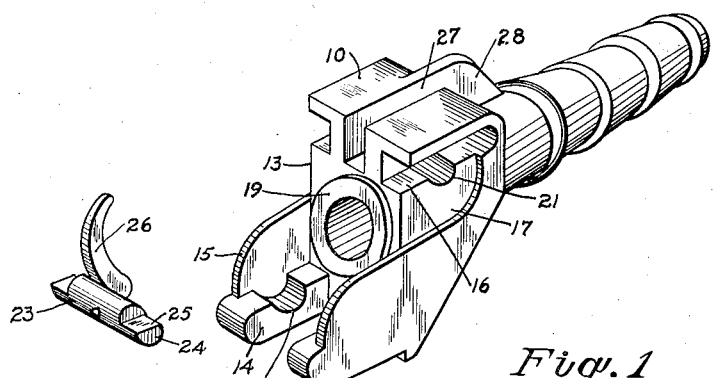
Figure 1 is a perspective elevation of one form of the new improved coupling.
Figure 2 is a perspective view of a locking pin and lever assembly suitable for use in the device shown in Fig. 1.

Referring to the drawing, the numeral 10 generally denotes identical fittings adapted to mate with each other, one of which is shown in perspective in Fig. 1. The corresponding parts of both fittings being identical in structure and function, are denoted by the same numerals. The fittings 10 have suitable tubular extensions 11 for insertion in hose, flanges 12 being provided to cooperate with hose clamps of known type.

The bodies 13 of fittings 10 are formed with forwardly extending rails 14 having integral side plates 15. Longitudinal rail recesses 16 and plate recesses 17 have inside dimensions substantially corresponding to the outside dimensions of rails 14 and side plates 15 respectively.

Figure 3:
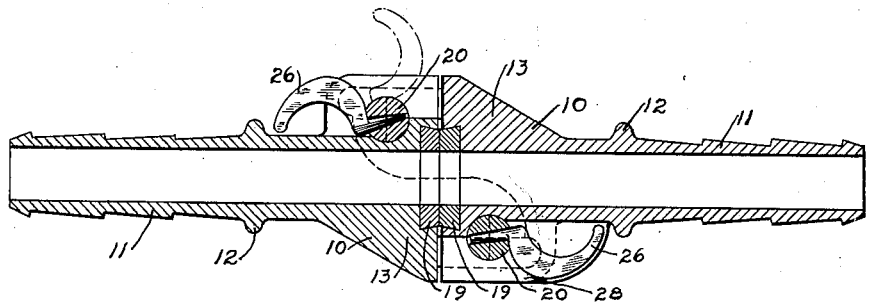
Figure 3 is a longitudinal sectional view of two of the coupling members such as shown in Fig. 1, fitted together with the locking pin and lever assembly shown in solid lines in the locked position.
Figure 4:
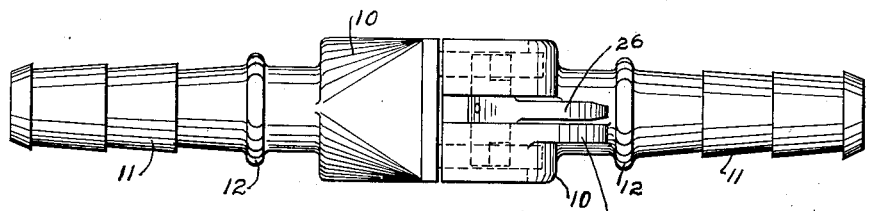
Figure 4 is an external view of the coupling assembly shown in Fig. 3.

Annular inwardly tapering recesses 18, Figure 3, contain resilient washers 19.

Cross holes 20 in bodies 13, Figure 3, are so located that their outer ends form semi-cylindrical recesses 21 in the surfaces of rail recesses 16.

Semi-cylindrical recesses 22 of like radius are formed in the faces of rails 14.

Clamping pins 23 of total length substantially equal to the width of bodies 13 inside plate recesses 17 are rotatably fitted in cross holes 20. The end portions 24 of pins 23 are cut away to their centers, forming flats 25. Curved levers 26 are riveted into pins 23 after the latter have been placed in holes 20. Longitudinal grooves 27 are provided in bodies 13 to accommodate levers 26. The numeral 28 denotes guard plates formed on bodies 13.

The operation of these fittings is as follows:

The levers 26 are swung outward as shown in dotted lines, Figure 3, causing the pins 23 to assume the rotative position shown in Figure 2 with respect to body 13, Figure 1. This causes the flats 25 to assume the planes of the bottoms of rail recesses 16. The two fittings are now slid together longitudinally, the side plates 15 entering the corresponding recesses 17 and the rails 14 sliding into their recesses 16 over flats 25, until the washers 19 come together. These washers, being resilient, initially protrude from their recesses and thereby hold the parts out of full engagement. The levers 26 are now depressed, revolving the pins 23. The end portions 24 engage the recesses 22, forcing them into concentric registry with recesses 21, thereby compressing the washers 19 and clamping the parts together as shown in Figure 3. The guard plates 28 protect the levers 26 in clamped position, preventing them from being accidentally released by catching on obstructions.

The dimensions of the parts are such that when clamped together the bodies 13 substantially meet, thus providing a firm assembly and preventing flexure of the washers in service, this desirable effect being further assured by the long bearing of the rigid rails 14 and side plates 15 in their respective recesses.

It will be noted that when the coupling is locked no part of the levers or cams extend beyond the extreme outside dimensions of the body. This structure, together with the outwardly tapered shape of the body members, gives in effect a "stream-lined" coupling which can be readily dragged without becoming fouled on obstructions such as debris often encountered in fire-hose, or air-hose service.

If a number of hose or other conduits are equipped with fittings of the character described, or substantially identical structure and dimensions, that is, having the actual clamping and sealing parts of identical shape and dimensions, any such hose or conduit terminal can be quickly joined to any other in the system. Differences in structure not affecting the actual coupling surfaces, such as different provisions for attaching different types of hose or conduit are immaterial, as they would not affect the universal coupling feature.

The advantage of the cams as shown in Figures 2 and 3, which act in such a direction that a tendency for the parts to separate only holds the cams more securely locked, is also obvious in fire service where dragging of hose and high internal pressure tend to force couplings apart. This locking tendency is especially valuable in a fitting subject to long use and hard service under which ordinary clamping means tend to loosen and release, due to wear.

It is obvious that the type of coupling shown may be used to join solid conduits such as electrical cables.

Although the invention has been disclosed in connection with specific details of a preferred embodiment thereof, it must be understood that such details are not intended to be limitative of the invention except in so far as set forth in the accompanying claim.

What is claimed is:

A conduit coupling comprised of two substantially identical co-acting body members having abutting faces, a longitudinal passage extending through each body member at right angles to its face, an annular recess for a sealing ring formed in each face concentric with said passages, a pair of spaced lugs on one side of each body member extending therefrom at its face end overhanging said face and spaced apart from the center axis of said passage, a curved notch formed in each of said lugs, said notches being substantially in line with each other and forming camming surfaces, a lug on each body member oppositely disposed to its pair of lugs, a transverse hole formed in said last lug, a longitudinal slot formed in said last lug at right angles to and communicating with said transverse hole, a cam shaft for each body member having a cam formed on each end thereof and positioned in said transverse hole, and a lever secured to the mid-portion of said cam shaft and positioned in said longitudinal slot, said cams on each body member being adapted to engage said camming surfaces on the other body member when said members are placed in cooperative relation, whereby the rotation of said cams and shafts through the medium of said levers may lock said members together.

JAMES A. O'DAY.